US008631416B2

(12) United States Patent
Rodriguez (10) Patent No.: US 8,631,416 B2
(45) Date of Patent: Jan. 14, 2014

(54) PARALLELIZING SCHEDULER FOR DATABASE COMMANDS

(75) Inventor: John Rodriguez, Capitola, CA (US)

(73) Assignee: Verisign, Inc., Reston, VA (US)

( * ) Notice: Subject to any disclaimer, the term of this patent is extended or adjusted under 35 U.S.C. 154(b) by 173 days.

(21) Appl. No.: 13/077,962

(22) Filed: Mar. 31, 2011

(65) Prior Publication Data

US 2012/0254887 A1    Oct. 4, 2012

(51) Int. Cl.
*G06F 9/46* (2006.01)

(52) U.S. Cl.
USPC .......................................................... 718/106

(58) Field of Classification Search
USPC .......................................................... 718/106
See application file for complete search history.

(56) References Cited

U.S. PATENT DOCUMENTS

| 6,970,959 | B1 * | 11/2005 | O'Hare et al. ................. 710/74 |
| 7,210,127 | B1 | 4/2007 | Rangachari |
| 7,681,016 | B2 | 3/2010 | Taylor |
| 2006/0005176 | A1 | 1/2006 | Kawahara et al. |
| 2010/0191716 | A1 * | 7/2010 | Chen et al. .................... 707/713 |
| 2010/0217865 | A1 * | 8/2010 | Ferris ............................. 709/226 |
| 2010/0325191 | A1 * | 12/2010 | Jung et al. ..................... 709/202 |
| 2010/0333108 | A1 | 12/2010 | Cypher |

OTHER PUBLICATIONS

Margaret H. Eich and David L. Wells, "Database Concurrency Control Using Data Flow Graphs", Jun. 1988, ACM Transactions on Database Systems, vol. 13, No. 2, pp. 197-227.*
W. Han & J. Lee, Dependency-Aware Reordering for Parallelizing Query Optimization in Multi-Core CPUs, SIGMOD-PODS '09—Proceedings of the International Conference on Management of Data and 28th Symposium on Principles of Database Systems in Providence, RI, Jun. 29-Jul. 2, 2009, pp. 45-57, ACM 978-1-60558-551-2/09/06.
M. Chen & K. Olukotun, The Jrpm System for Dynamically Parallelizing Java Programs, ISCA '03 Proceedings of the 30th annual international symposium on Computer architecture in San Diego, CA, Jun. 2003, IEEE, Piscataway, NJ.
Transmittal of International Search Report and Written Opinion mailed Feb. 17, 2012, in PCT Application PCT/US2011/064323 (11 pages).
Eich, Margaret H. and Wells, David L., "Database Concurrency Control Using Data Flow Graphs," ACM Transactions on Database Systems, vol. 13, No. 2, Jun. 1988, pp. 197-227.

* cited by examiner

*Primary Examiner* — Emerson Puente
*Assistant Examiner* — Steven Do
(74) *Attorney, Agent, or Firm* — MH2 Technology Law Group, LLP (57) ABSTRACT

A system, method, and computer-readable medium, is described that enables a parallelizing scheduler to analyze database instructions, determine data dependencies among instructions, and provide a multi-threaded approach to running instructions in parallel while preserving data dependencies.

21 Claims, 12 Drawing Sheets

| PHONEBOOK1 | |
|---|---|
| Name | Phonenum |
| Dallas Jones | 555-555-0001 |
| Sam Smith | 555-555-0002 |
| Eddy White | 555-555-0003 |

130

| PHONEBOOK2 | |
|---|---|
| Name | Phonenum |
| Peter Pete | 555-555-0011 |
| Sally Sales | 555-555-0012 |

| SQL Instructions | Type of Operation |
|---|---|
| CREATE | ⟶ WRITE |
| INSERT | ⟶ WRITE |
| UPDATE | ⟶ WRITE |
| SELECT | ⟶ READ |
| DELETE | ⟶ WRITE |

| Sequence Type | Type of Data Dependency |
|---|---|
| READ after WRITE | ⟶ True dependence |
| WRITE after READ | ⟶ Anti-dependence |
| WRITE after WRITE | ⟶ Output dependence |
| READ after READ | ⟶ No dependence |

PARALLELIZING SCHEDULER FOR DATABASE COMMANDS

TECHNICAL FIELD

This disclosure relates to the parallelizing of sequential database commands.

BACKGROUND

Databases are an essential part of computing and information management. Databases provide data storage and an interface to insert, update, delete, and retrieve the data found therein. Generally, a database processes instructions sequentially, one instruction after another. This is at least in part due to the typical operation of a database. Typically, a user will request information from the database as it is needed, insert a new record in the database as it is created, update a database record as soon as an edit is received, or delete a record as soon as it is no longer needed. Sequential operation of a database does have some advantages. For instance, data dependency is easily maintained. Because each statement executes one after another, there is little worry of retrieving out-of-date information. Not all database operations, however, need to occur sequentially. In fact, most probably do not.

Due to the data integrity requirements of a database, each database vendor has its own methods of providing data quality assurances through the use of locking algorithms to ensure a particular database table, record, or field is not read if it is currently being accessed for a write operation. Processing instructions as they are received results in execution inefficiencies because a read operation may be unrelated to the next write operation or two sequential write operations may be on two different tables; these operations could be executed concurrently, reducing execution cycles, execution time, and execution overhead. The inefficiencies increase the cost of hardware and software required because more database servers are required to handle increased loads.

These inefficiencies are also passed on to a backup database and a developmental database. For example, a production database server or cluster of servers might pass the instructions it receives to a backup database environment or developmental database. The backup database or developmental database must handle the same write load as the production database. This could result in significant costs in secondary database servers or clusters to support the backup or developmental databases. A method is needed to reduce the costs of operating such systems.

With parallelization as an intermediary, the number of instruction cycles on the backup or developmental database can be significantly reduced, allowing for cheaper hardware and less additional software licenses. The database instructions may first be passed to the parallelizing scheduler and then to the secondary database which may then run the instructions in parallel in a multi-threaded operation. Another example where parallelization would be useful is when a database fails, because restoring the database from transaction logs can take a significant amount of time. Parallelization can optimize the transaction logs to significantly reduce the overall number of cycles, allowing for faster recovery. Transaction logs may even be parallelized in advance. Parallelization can also help further reduce costs by enabling the database operator to keep a backup database on a different database platform. For example, the production environment might use an expensive license based database, but with parallelization the backup may use an inexpensive, custom, or free database to greatly reduce operating costs. With the proliferation of dynamic web sites, parallelization implemented at the web site script code level would reduce the load on a database, prolonging the longevity of equipment without the need to upgrade as quickly or expand into more complicated multiple database setups. Finally, a database product could benefit from using a parallelizing scheduler in the processing of commands. Rather than simply processing commands sequentially, the parallelizing scheduler may store the commands in memory, optimize the commands, and run them in parallel.

A simple example is where (i) data is written to Table A and (ii) data is read from Table B. Because these two instructions have no dependency on each other, they can be executed in parallel, rather than sequentially. In general, consider five basic SQL commands: SELECT, INSERT, UPDATE, DELETE, and CREATE. At their core these correspond to operations to READ, WRITE, WRITE, WRITE, and WRITE on the database, respectively. Now, consider a table with two columns, "name" and "phonenum." When a READ statement requests data from the table after a WRITE statement to the table, then a true data dependency exists, i.e., executing the READ statement before the WRITE statement may result in unexpected results. When a WRITE statement to the table follows a READ statement to the table, then anti-dependency exists, i.e. executing the READ statement after the WRITE statement may result in unexpected results. When a WRITE statement to the table follows another WRITE statement to the table, then output dependency exists, i.e., executing the WRITE statements in the reverse order will result in incorrect values in the database. Note that the final combination of statements, the READ after READ statement will never result in a data dependency because the data is the same for each execution. Using these data dependency relationships, sequential database instructions may be construed into in parallel execution levels.

SUMMARY

A computer-implemented method of parallelizing database commands includes receiving and processing by a computer a listing of sequential database commands into data dependent chains. The method includes grouping the database commands based on data dependencies into an execution schedule that enables the commands to be processed in parallel while maintaining their data dependencies. The method also includes delivering the execution schedule.

It is to be understood that both the foregoing general description and the following detailed description are exemplary and explanatory only and are not restrictive of the application, as claimed.

The accompanying drawings, which are incorporated in and constitute a part of this specification, illustrate one (several) embodiment(s) of the application and together with the description, serve to explain the principles of the application.

DETAILED DESCRIPTION

Reference will now be made in detail to the exemplary embodiments. Wherever possible, the same reference numbers will be used throughout the drawings to refer to the same or like parts.

Figure 1:
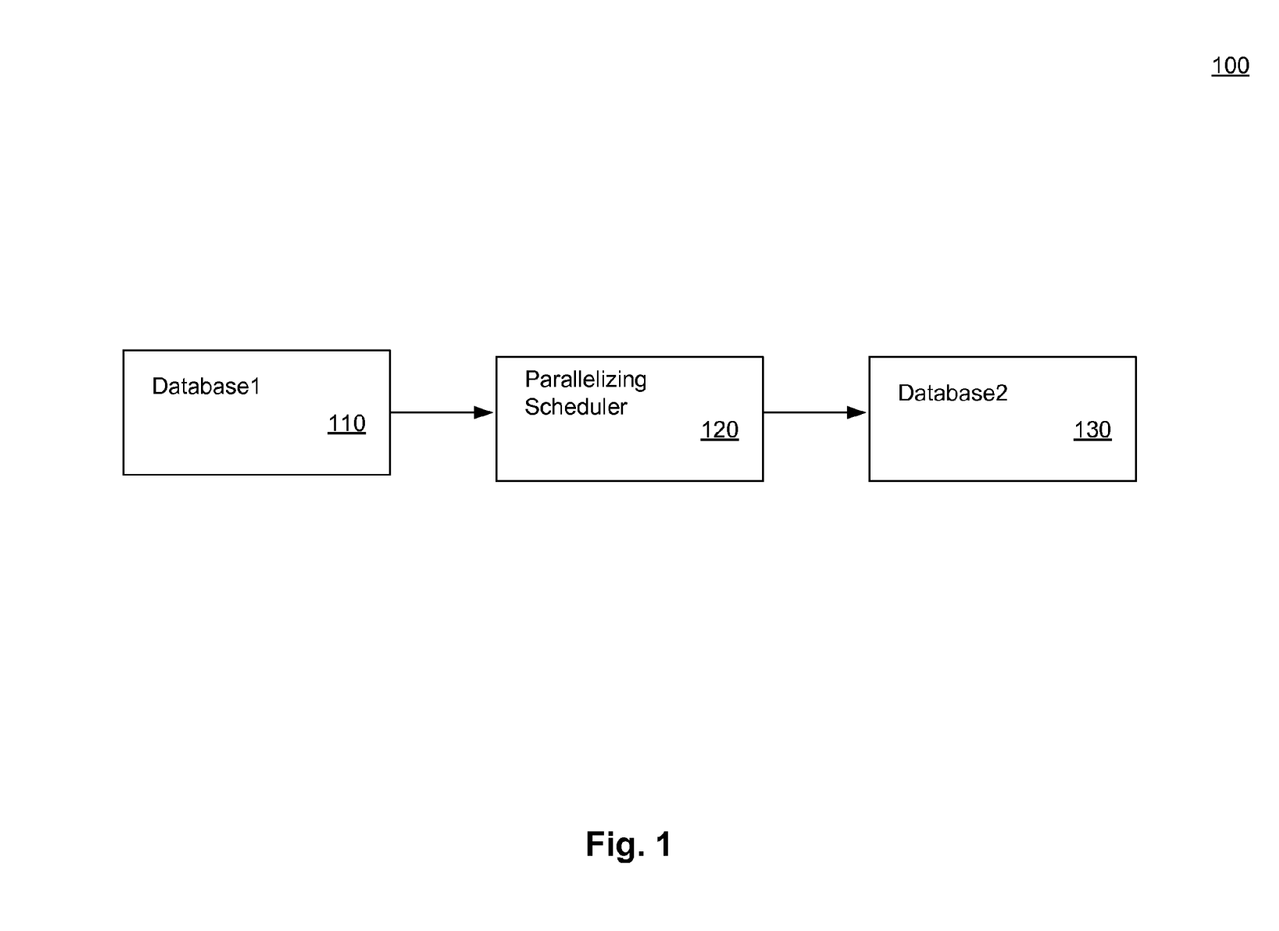
FIG. 1 is an illustration of the relationship between a first database, a second database, and a parallelizing scheduler.

In one embodiment, FIG. 1 illustrates the relational position of a first database 110, the parallelizing scheduler 120, and a second database 130. Other embodiments, however, are consistent with the operation of the parallelizing scheduler 120. For example, Database1 110 may be replaced with an instruction aggregator, a database transaction file, a SQL script, or any source that may present a sequence of database instructions. The instruction aggregator may be used to parse database instructions from a running web script and submit them to the parallelizing scheduler 120 for optimization. The parallelizing scheduler 120 may take a database transaction file or SQL script file and optimize them. Note that, as used in this application, "optimization" does not require an ultimately optimized solution, but rather just the parallelization of a set or subset of database instructions, or, in other words, any reduction in the number of cycles required to execute sequential database instructions.

In one embodiment, the parallelized instructions resulting from the parallelizing scheduler 120 are applied to Database2 130. Database2 130, however, may be replaced by a simple file, as when the user desires to save the output of the parallelizing scheduler 120. It may be even that the output of the parallelizing scheduler 120 stores the results in Database2 130 without applying them to the database. Database2 130 should also be understood to include the logical relationships of the database as well as the database program itself, but in another embodiment, the parallelizing scheduler may also be included within the database program found in Database2 130. Although possible, none of the entities of FIG. 1 need be found on one set of hardware. In particular, besides each one being represented on its own device, each one may be represented in multiple devices. Also, Database1 110 and Database2 130 may be the same database.

Figure 2:
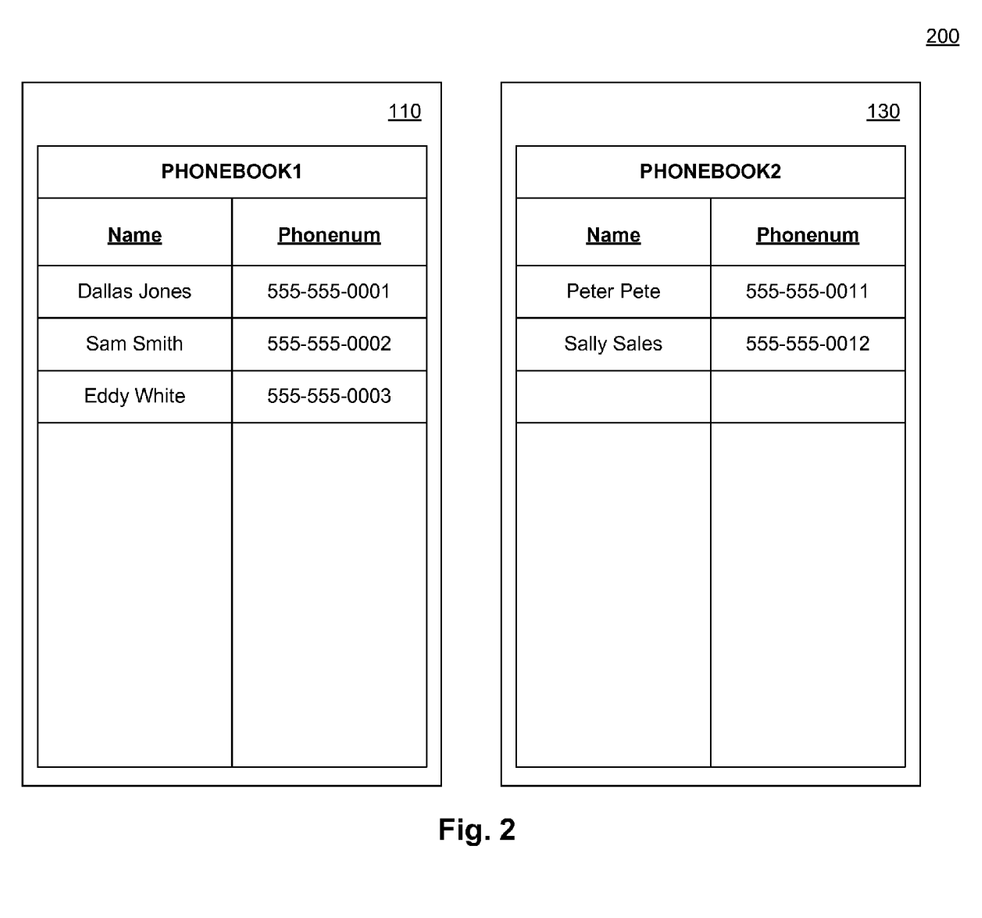
FIG. 2 shows some exemplary database entries for use in the discussion of the parallelizing scheduler.

FIG. 2 illustrates two exemplary databases 110 and 130 and one table defined in each 210 and 230, labeled PHONEBOOK1 and PHONEBOOK2, respectively. These tables and the data entries therein will be referred to from time to time in this application to provide examples of the processes of the embodiments described herein. These are meant to be exemplary only. In particular, although the structure of each of these tables is exactly the same, they need not be. Nor do the tables need to reside in different databases.

PHONEBOOK1 and PHONEBOOK2 each have two columns, Name and Phonenum, expressed herein as {Name, Phonenum}. PHONEBOOK1 has three records, {Dallas Jones, 555-555-0001}, {Sam Smith, 555-555-0002}, and {Eddy White, 555-555-0003}. PHONEBOOK2 has two records, {Peter Pete, 555-555-0011} and {Sally Sales, 555-555-0012}. For the sake of convenience, the application will refer to each of these as Record 1, 2, and 3 with regard to the records found in PHONEBOOK1, and Record 1 and 2, with regard to the records found in PHONEBOOK2.

Figure 3:
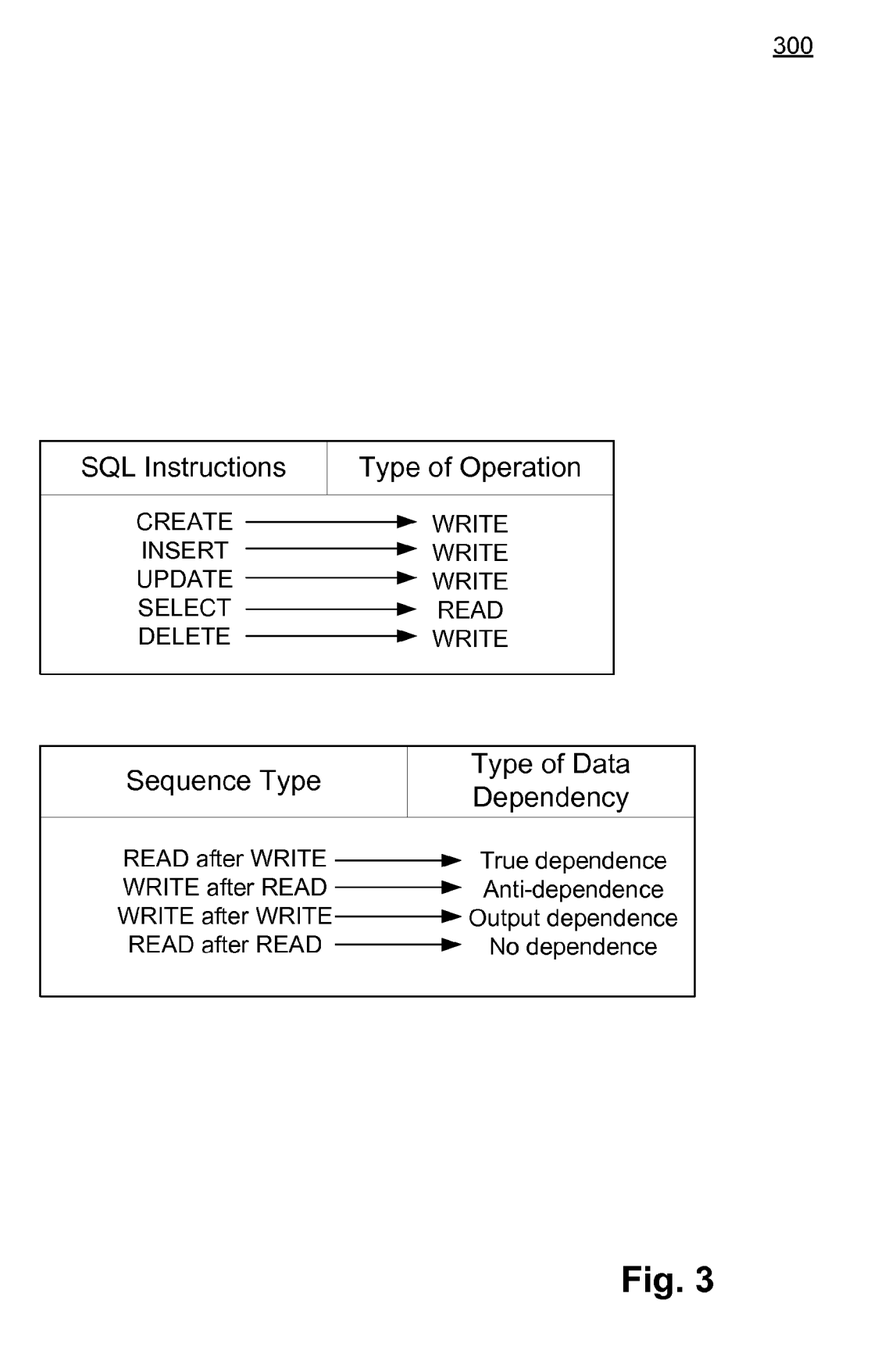
FIG. 3 is an illustration of some typical SQL instructions, their inherent operation, and types of data dependency based on instruction sequencing.

FIG. 3 illustrates five common SQL statements, CREATE, INSERT, UPDATE, SELECT, and DELETE, and connects each one to WRITE, WRITE, WRITE, READ, and WRITE, respectively. This is done to demonstrate that a CREATE command is a type of WRITE command, that an INSERT command is a type of WRITE command, and so forth.

Also illustrated in FIG. 3 are the types of data dependencies possible when looking at any two instructions out of a given sequence of instructions. When a READ instruction comes after a WRITE instruction on the same table or column, this is considered a true data dependency. The dependency exists because the WRITE operation may alter the values returned in the READ operation. For example, suppose the two instructions are (1) WRITE PHONEBOOK1 {Joy Davis, 555-555-0004} and (2) READ all of PHONEBOOK2. If (2) were to take place before (1), then only three records would be returned, whereas with the order preserved, four records are returned. When a WRITE instruction comes after a READ instruction, then anti-dependency exists. For example, renumbering (1) and (2) above to (2) and (1), respectively, now, the preserved sequential operation of the instructions would return three records, but if the order were reversed, then four records would be returned. When a WRITE instruction comes after a READ instruction then output dependency exists. For example, suppose the two instructions are (1) WRITE PHONEBOOK1 {0, 555-555-0004} WHERE name is like 'Dallas,' and (2) WRITE PHONEBOOK1 {0, 555-555-0005} WHERE name is like 'Dallas,' where the "0" in "{0, 555-55 . . . }" indicates that the name is not written. If performed in order, Record 1 of PHONEBOOK1 would contain the values {Dallas Jones, 555-555-0005}, but if performed in reverse order, Record 1 of PHONEBOOK1 would contain the values {Dallas Jones, 555-555-0004}.

Figure 4:
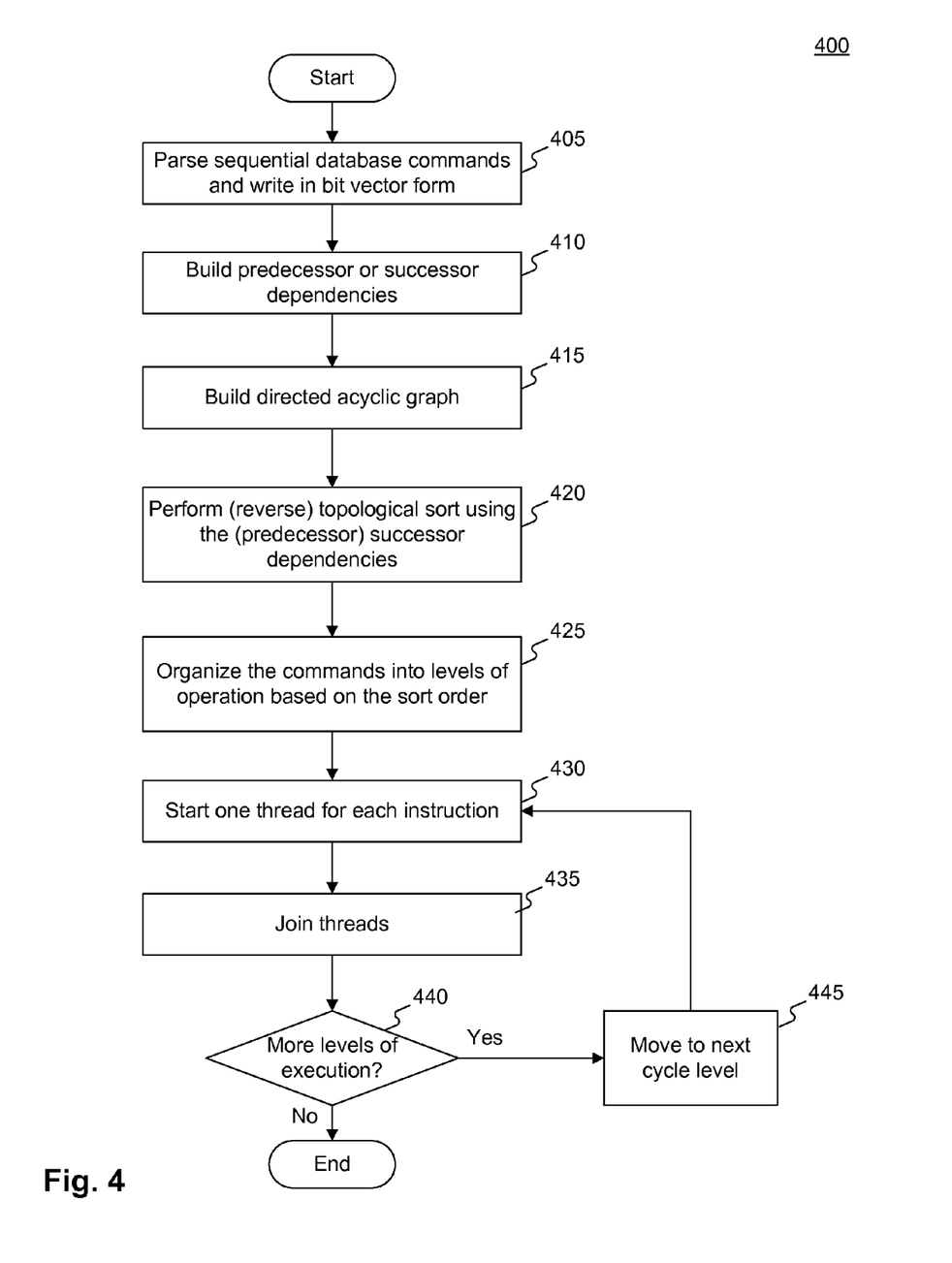
FIG. 4 is an illustration of an exemplary process to perform the parallelizing scheduler.

FIG. 4 illustrates one embodiment of the parallelizing scheduler process 400. The sequence of instructions is parsed and represented in bit vector form (step 405). The process determines the predecessor and successor dependencies (step 410). A directed acyclic graph is built by mapping the predecessor and successor dependencies (step 415). The process 400 performs a topological sort (or reverse topological sort based on the successor (or predecessor) dependencies (step 420). Walk the sort and assign a level number to each instruction (step 425). Starting at the first level, a thread is started for each instruction and submitted (step 430). The threads are joined (step 435). If there are more levels to execute then the next level is evaluated at step 430 again until all the instructions have been executed (step 435). These steps will be put in context and explained more clearly below.

Figure 5:
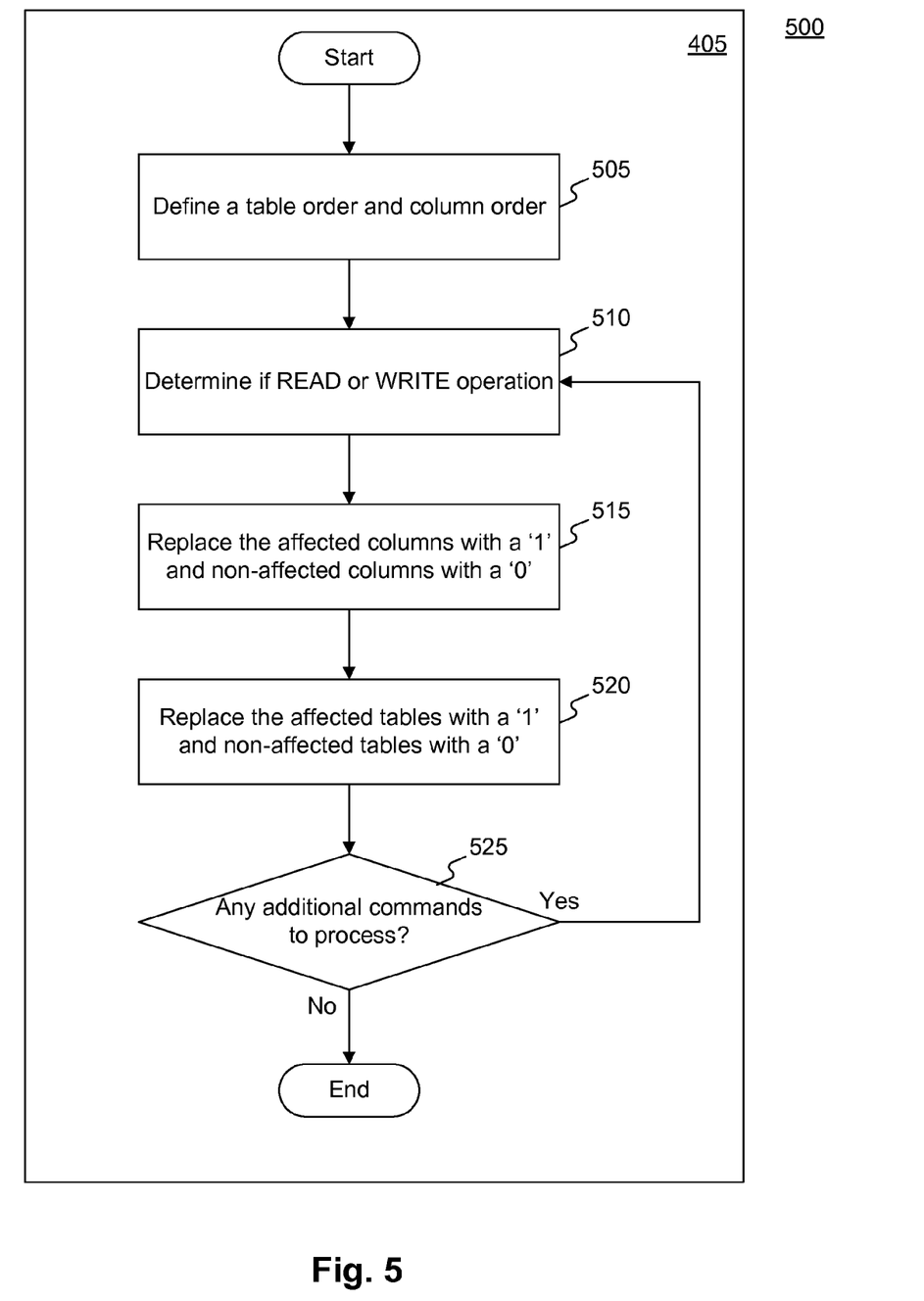
FIG. 5 is a more detailed illustration of the step of "Parse sequential database commands and write in bit vector form" found in FIG. 4.

FIG. 5 illustrates in more detail the step of parsing the sequential instructions and expressing them in bit vector form. Note that the set of sequential instructions parsed need not be the entire available set of instructions, but may be processed in subsets. Initially, a table order and column order are defined (step 505). Doing so ensures that representation of the database instructions is consistent. With respect to the example tables of FIG. 2, the table order is {PHONEBOOK1, PHONEBOOK2} and within each, {Name, Phonenum}.

Each instruction is put into bit vector form. The purpose is to more easily express and find the dependencies. It is not necessary to use bit vector form, but the principles of operation on the instructions in the parallelizing scheduler process remains the same. Beginning with the first instruction, determine if it is a READ or WRITE operation (step 510). Next determine the affected tables and columns by the operation (step 515). If the instruction is a READ operation, the affected columns would be found in the "where" clause of standard SQL. If the instruction is a WRITE operation, then the affected column or columns would be those whose values are changed by the operation.

If the column is affected by the operation, a "1" is placed in its vector space, and if the column is not affected by the operation a "0" is placed (step 520). The same operation is done for the table vector space (step 525). Consider the following transition from instruction to bit vector notation.

```
Insert into PHONEBOOK1 (name= 'Cody Cow',
phonenum='555-555-0005')
    WRITE PHONEBOOK1 .{name= 'Cody Cow', phonenum= '555-
555-0005'}
    WRITE PHONEBOOK1.{1, 1}
    WRITE {1, 0}.{1, 1)
```

Figure 6:
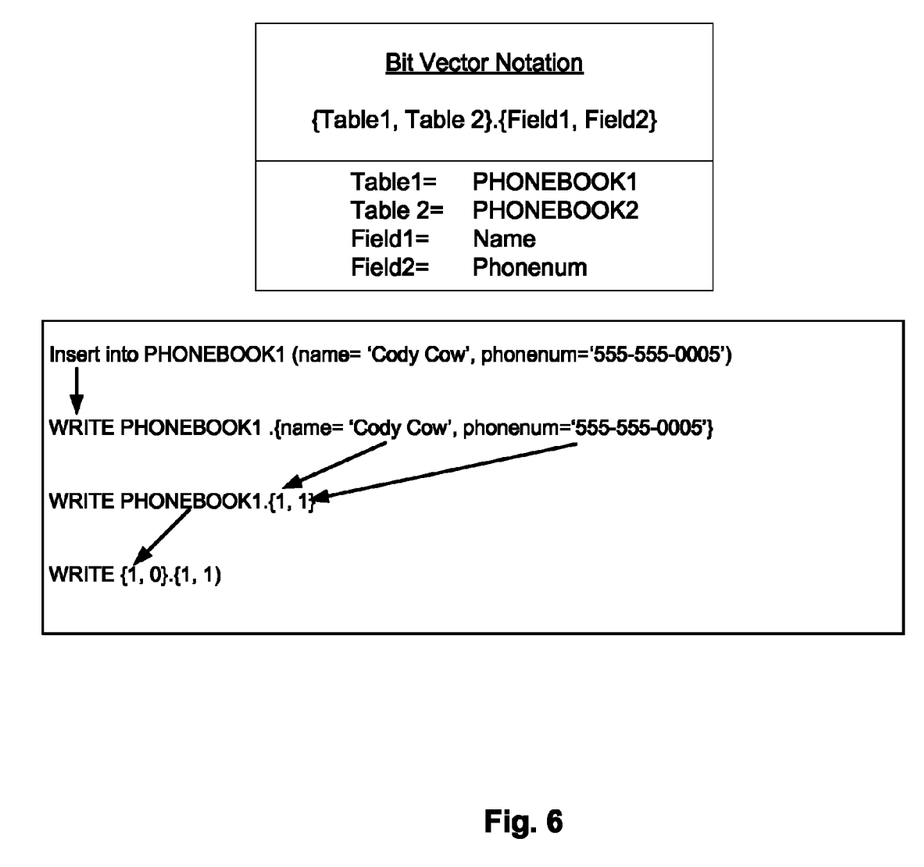
FIG. 6 is an illustration of bit vector notation.

FIG. 6 further illustrates this notation with more examples.

Figure 7:
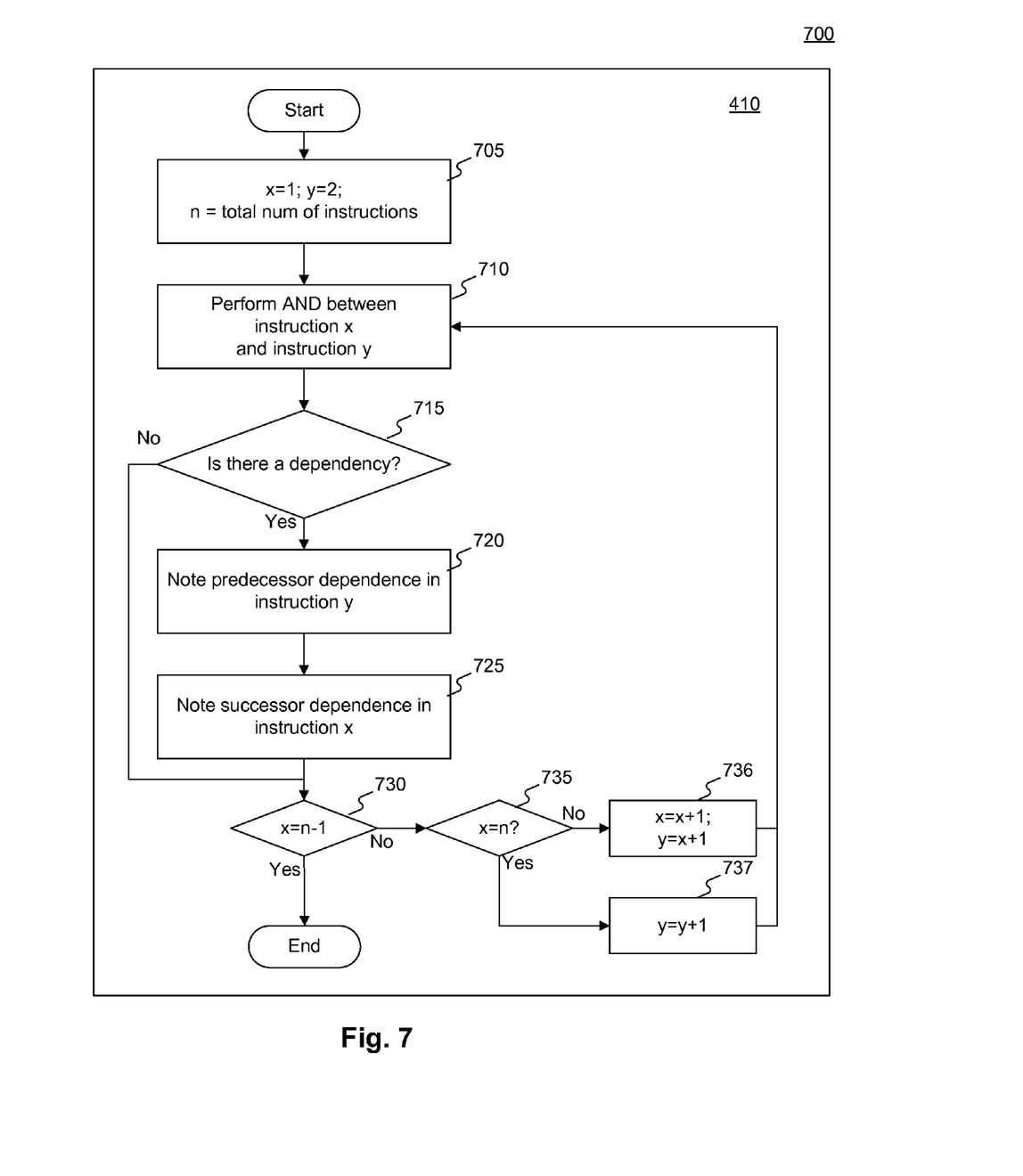
FIG. 7 is a more detailed illustration of the step of "Determine Predecessor and Successor Information" found in FIG. 4.

FIG. 7 illustrates an exemplary process 700 for determining the predecessor and successor dependencies among the list of bit vector instructions. Note that it is not necessary to perform both predecessor and successor dependencies, but if both are done, one can be used to check against the other. Also, building the directed acyclic graph from one method may result in fewer levels than the other method. Because two instructions are going to be compared at a time, set x=1 and y=2 (step 705). Perform a logical AND vertically between instruction x and instruction y (step 710). Then determine if there is a dependency based on the outcome of the AND operation (step 715). For example, suppose the database operations and outcome of the AND looked like this:

| 1. WRITE | {1, 0}.{1, 0} |
| 2. READ | {1, 0}.{0, 1} |
| AND | {1, 0}.{0, 0} |

In this case, there is a READ after WRITE (true dependency) on the table, but there is no dependency in the columns. If the target database, Database2 130, is capable of locking individual columns, rather than entire rows, then these two operations can be run in parallel, reducing operation levels to one. If, however, the target database locks the entire row, then they would still be executed sequentially.

Now, suppose the operation was slightly different:

| 1. WRITE | {1, 0}.{1, 0} |
| 2. READ | {1, 0}.{1, 1} |
| AND | {1, 0}.{1, 0} |

In this case, there are both table and column dependencies. These may be noted as follows:

| Operation | | Predecessor | Successor |
|---|---|---|---|
| 1. WRITE | {1, 0}.{1, 0} | None | 2(T) |
| 2. READ | {1, 0}.{0, 1} | 1(T) | None |

Figure 8:
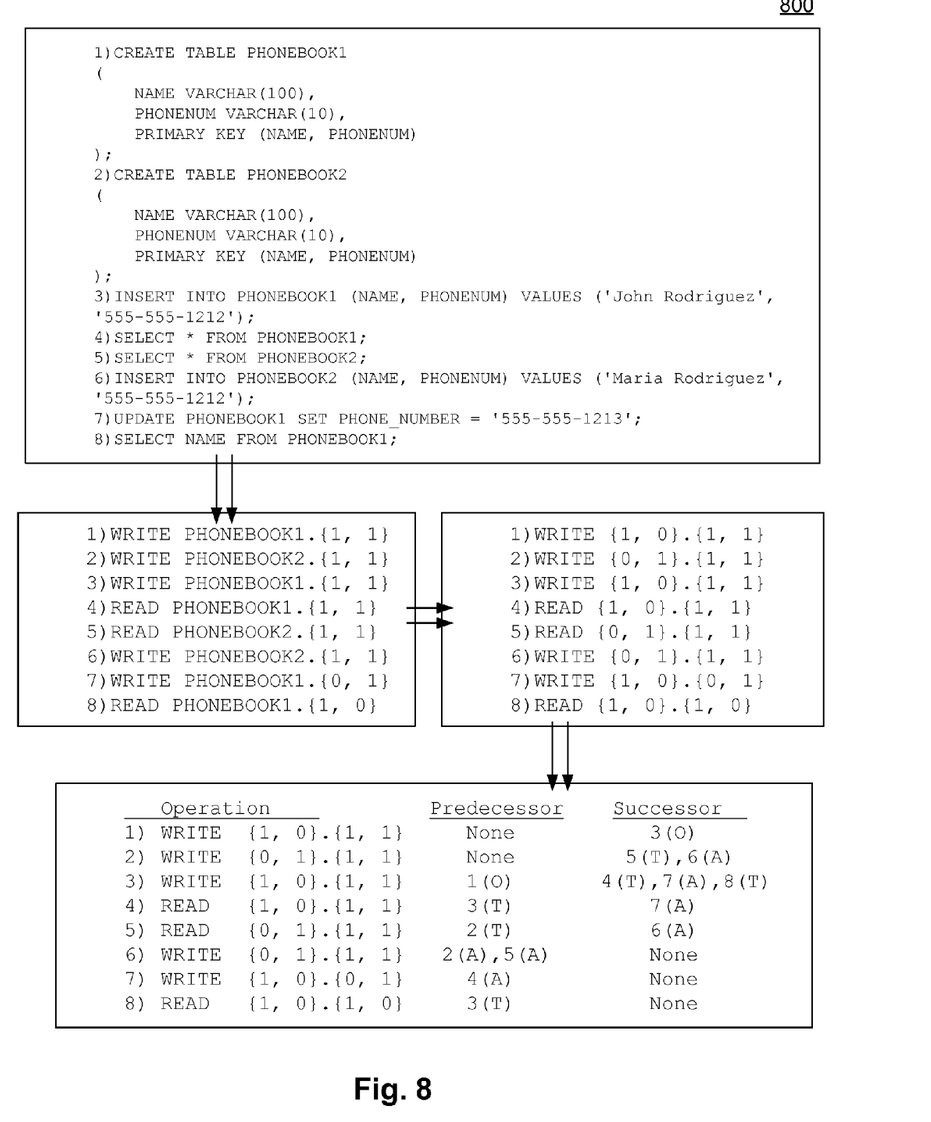
FIG. 8 illustrates an exemplary instruction set and resulting predecessor and successor information.

The predecessor notes any operations that must come before the current operation, and the successor notes any operations that must come after the current operation. If x is equal to the next to last numbered instruction, then the dependency determination is complete (step 730). Otherwise, if y is equal to the last numbered instruction (step 735), then x is incremented by 1 and y is set to the instruction after x, or x+1 (step 736). If y is not equal to the last numbered instruction, then y is incremented by 1 (step 737). In this way, every operation is compared to every other operation one time. Note that in the above example, the notation for "(T)" indicates a "true data dependency." A more comprehensive illustration will be explained below. FIG. 8 illustrates further examples and will be discussed below.

Figure 9:
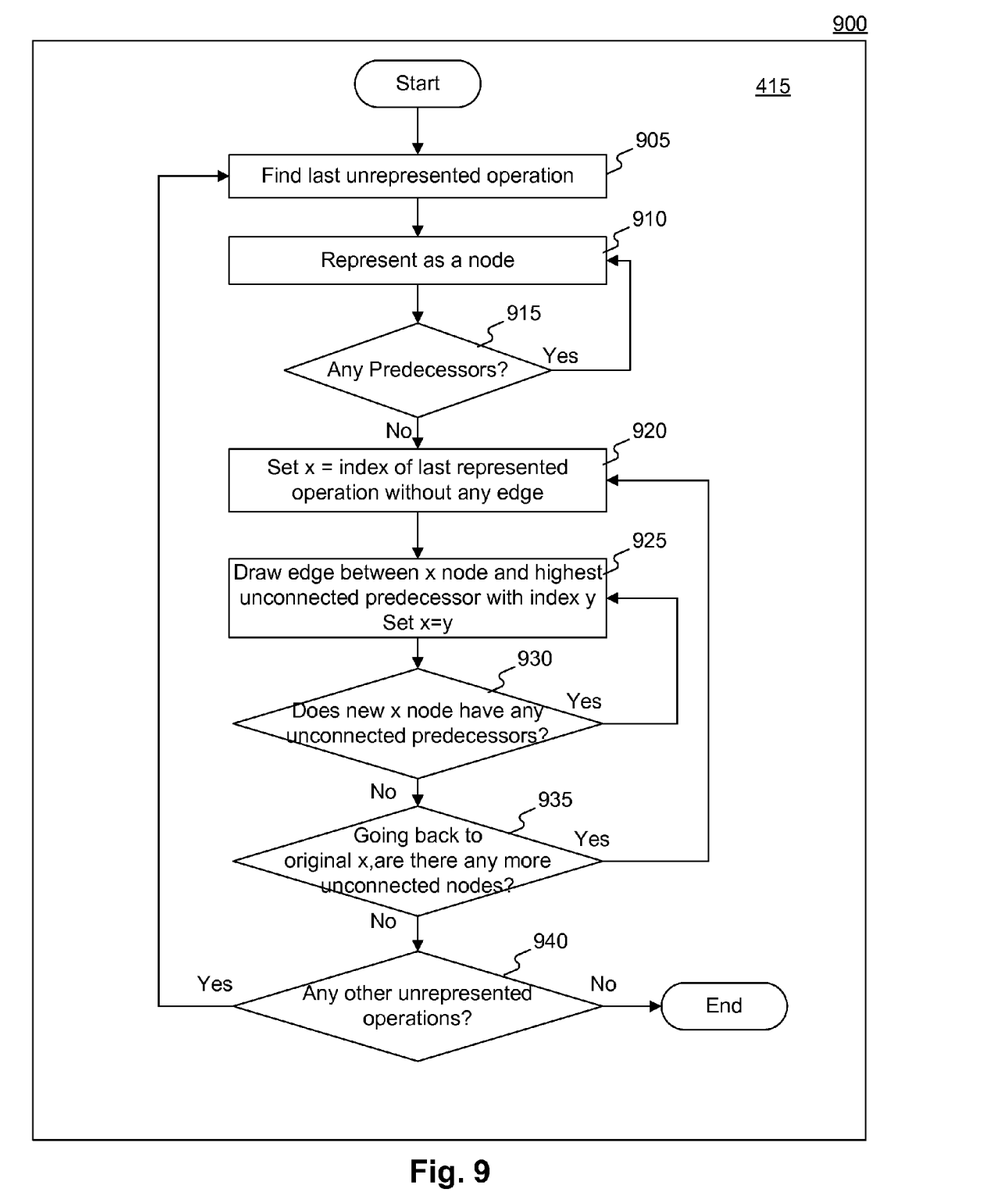
FIG. 9 is a more detailed illustration of the step of "Draw Graph based on Predecessor Information" found in FIG. 4.
Figure 10:
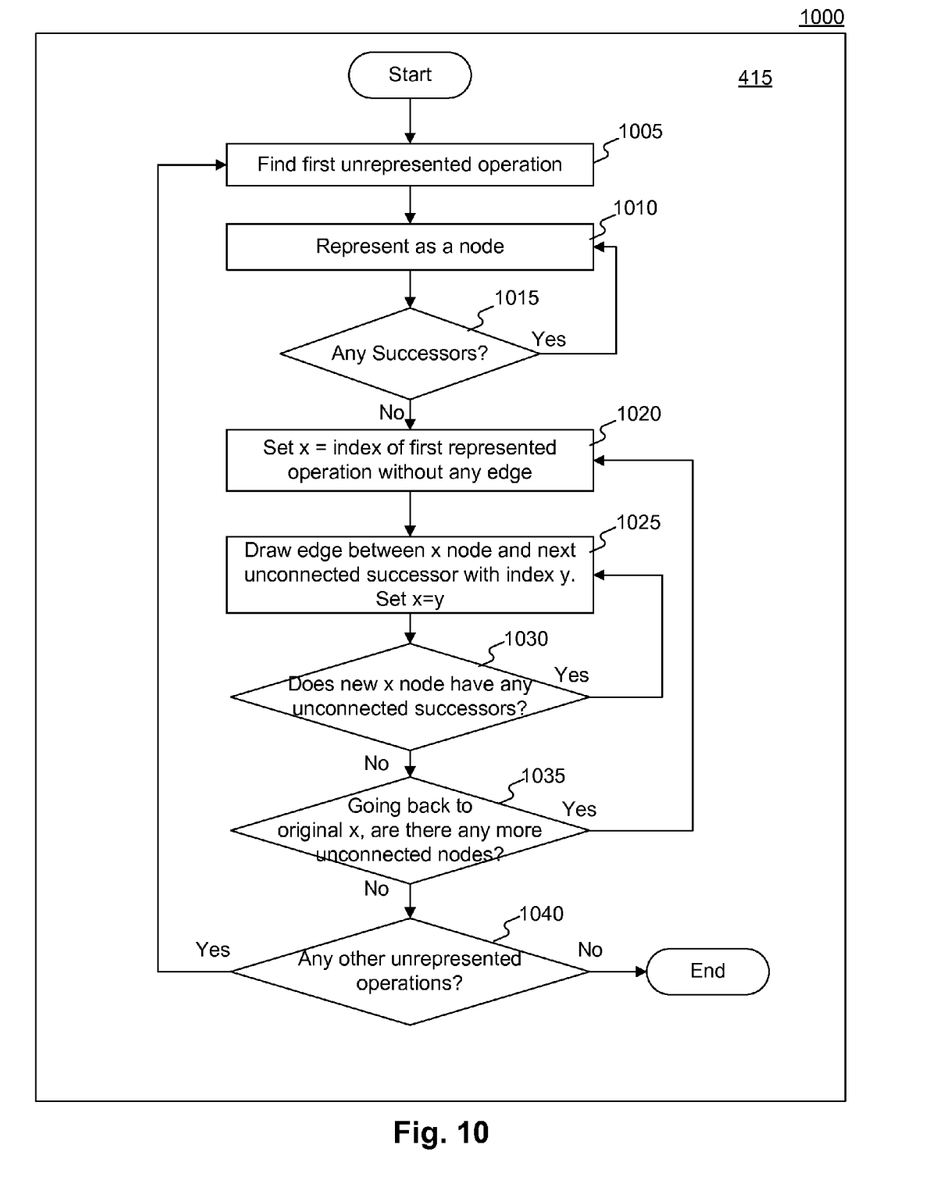
FIG. 10 is a more detailed illustration of the step of "Draw Graph based on Successor Information" found in FIG. 4.

In one embodiment, to build a directed acyclic graph, the parallelizing scheduler may use either the predecessor information as in process 900 or successor information as in process 1000. In FIG. 9, the process 900 begins with the last unrepresented instruction and represents it as a node (steps 905 and 910). All of the predecessors of that node are then examined and also represented as nodes (step 915). And again with these nodes, all of the predecessors are examined and represented as nodes. This way one chain of dependent database instructions are identified and examined at a time. Starting at the last identified operation that does not have an edge (or reverse arrow) drawn to it (step 920), draw an edge between the x node and the highest represented unconnected predecessor (step 925). Determine whether the now connected highest indexed predecessor has any unconnected predecessors (step 930). If so, then starting at that node repeat the steps of 925 and 930 until the newest connected node has no more predecessors. Then, going back to the original indexed operation, or in the first time through the process, the highest indexed (last) operation, determine whether there are any more unconnected nodes in the current chain (step 935). Repeat the above steps starting at 920 if so. Otherwise determine if there are any other unrepresented operations, or in other words, whether there are any more dependency chains (step 940). If so, then repeat the process starting at step 905 for the new chain. Otherwise, all of the operations should now be mapped into a directed acyclic graph. Note that the parallelizing scheduler does not require that a directed acyclic graph be physically "drawn." Rather, this explanation is to give an understanding of how the dependencies are determined and ultimately collapsed into fewer levels of parallel operations. In particular, the same results can be found by performing a reverse topological sort based on analyzing the predecessor information directly without drawing a graph. Therefore, one should understand that the term "graph level" represents a particular level in the order of parallelized operations regardless of whether a graph was drawn.

In contrast to the predecessor examination of 900, the successor examination of 1000 found in FIG. 10, applies the same principles starting at the first operation. Starting at the leaf nodes as in 900 may result in a fewer number of graph levels than starting at the base node as in 1000. In FIG. 10, the process 1000 begins with the first unrepresented instruction and represents it as a node (steps 1005 and 1010). All of the successors of that node are then examined and also represented as nodes (step 1015). And again with these nodes, all of the successors are examined and represented as nodes. This way one chain of dependent database instructions are identified and examined at a time. Starting at the first identified operation that does not have an edge (or arrow) drawn to it, the x node (step 1020), draw an edge between the x node and the lowest represented unconnected successor, the y node (step 1025). Determine whether the y node has any unconnected successors (step 1030). If so, then starting at that node (assign it as the new x node) repeat the steps of 1025 and 1030 until the newest connected node has no more successors. Then, going back to the original indexed operation, or in the first time through the process, the first operation, determine whether there are any more unconnected nodes in the current chain (step 1035). If so, repeat the above steps starting at step 1020. Otherwise, determine if there are any other unrepresented operations, or in other words, whether there are any more dependency chains (step 1040). If so, then repeat the process starting at step 1005 for the new chain. Otherwise, all of the operations should now be mapped into a directed acyclic graph. Note that the parallelizing scheduler does not require that these graphs be "drawn." Rather, this explanation is to give an understanding of how the dependencies are determined and ultimately collapsed into fewer levels of parallel operations. In particular, the same results can be found by performing a topological sort based on analyzing the successor information directly without drawing a graph. Therefore, one should understand that the term "graph level" should be understood to represent a particular level in the order of parallelized operations regardless of whether a graph was drawn.

Using the principles found in the process of 900 and 1000, the predecessor lists or successor lists may be evaluated directly using known programming techniques. A visual representation of the directed acyclic graph is not required. Moreover, in one embodiment, calculation of the dependencies may be reduced at the expense of additional database instruction levels. For example, in the process of 1000, the parallelizing scheduler may perform steps 1005, 1010, and 1015, then instead of continuing to 1020, organize the represented nodes in ascending order and return operation to 1005 to find any additional dependency chains. In other words, identifying dependency chains and relying on the original sequential order of the commands will result in minimal parallelization at a reduced calculation cost. If at least two dependency chains exist, then some parallelization can be achieved this way instead.

In one embodiment, the parallelizing scheduler may also make a decision whether to apply basic parallelization or more complex parallelization depending on the number of dependency chains and length of dependency chains. For example, suppose the parallelizing scheduler examines 100 instructions and finds 5 dependency chains of instructions each with 20 instructions. Rather than examine each of these dependency chains for further optimization, it may just accept the results of parallelization of dependency chains, and preserve the original order of instructions within each dependency chain. Now suppose that the parallelizing scheduler examines 100 instructions and finds 5 dependency chains of instructions, 1 with 80 instructions and the others 4 with 5 instructions each. The parallelizing scheduler may apply the processes here to further optimize the dependency chain of 80 instructions while leaving the other dependency chains to execute in sequential order.

Figure 11:
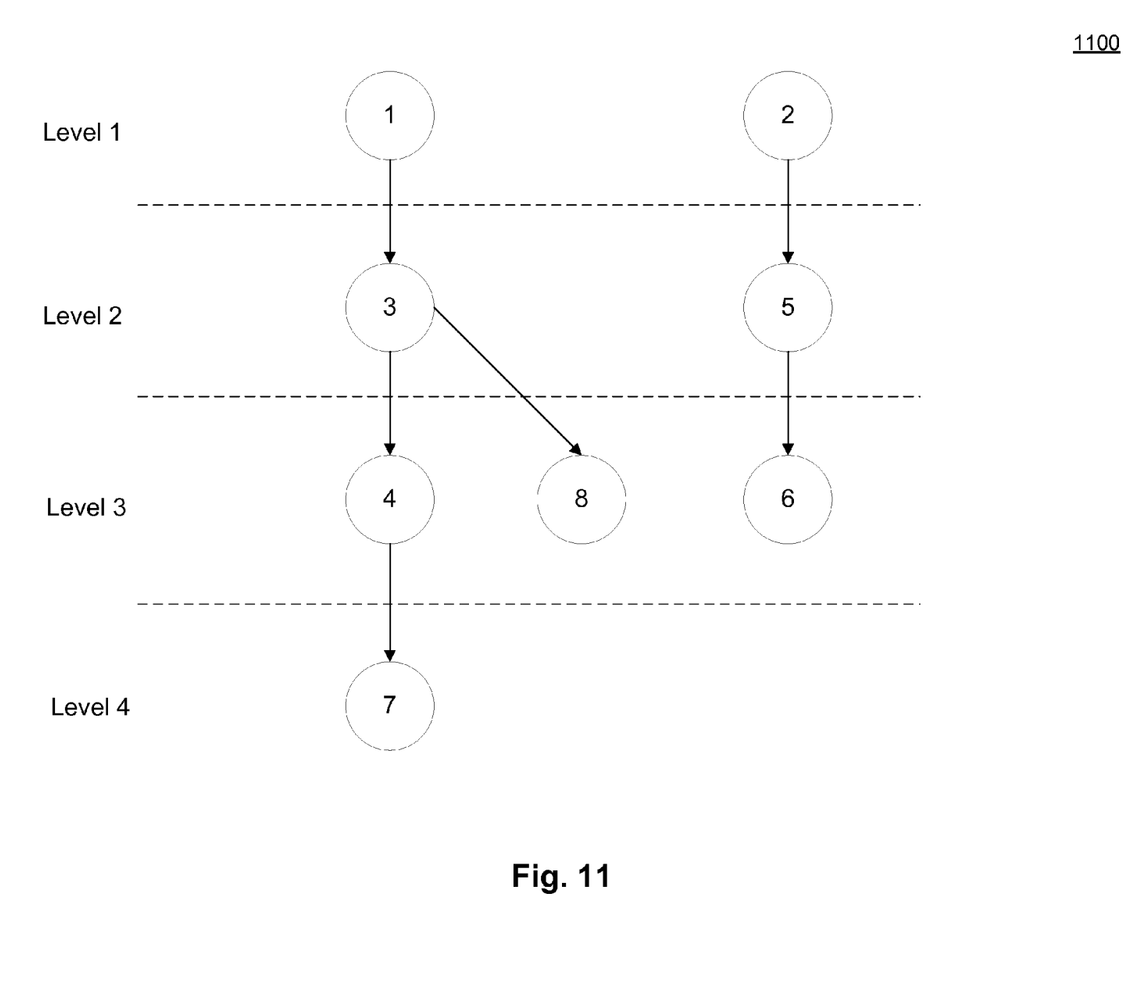
FIG. 11 illustrates an exemplary acyclic graph expressing each instruction in a node to node system with edges.

FIG. 11 illustrates representative directed acyclic graphs based on the following instructions as found in FIG. 8 (note that the number of the instruction simply refers to its position in the sequential list):

```
1) CREATE TABLE PHONEBOOK1
(
    NAME VARCHAR(100),
    PHONENUM VARCHAR(10),
    PRIMARY KEY (NAME, PHONENUM)
);
2) CREATE TABLE PHONEBOOK2
(
    NAME VARCHAR (100),
    PHONENUM VARCHAR(10),
    PRIMARY KEY (NAME, PHONENUM)
);
3) INSERT INTO PHONEBOOK1 (NAME, PHONENUM) VALUES
('John Rodriguez', '555-555-1212');
4) SELECT * FROM PHONEBOOK1;
5) SELECT * FROM PHONEBOOK2;
6) INSERT INTO PHONEBOOK2 (NAME, PHONENUM) VALUES
('Maria Rodriguez', '555-555-1212');
7) UPDATE PHONEBOOK1 SET PHONE_NUMBER =
'555-555-1213';
8) SELECT NAME FROM PHONEBOOK1;
```

These instructions can be simplified into partial bit vector form as:

```
1) WRITE PHONEBOOK1.{1, 1}
2) WRITE PHONEBOOK2.{1, 1}
3) WRITE PHONEBOOK1.{1, 1}
4) READ PHONEBOOK1.{1, 1}
5) READ PHONEBOOK2.{1, 1}
6) WRITE PHONEBOOK2.{1, 1}
7) WRITE PHONEBOOK1.{0, 1}
8) READ PHONEBOOK1.{1, 0}
```

They can be further simplified into bit vector form as

```
1) WRITE {1, 0}.{1, 1}
2) WRITE {0, 1}.{1, 1}
3) WRITE {1, 0}.{1, 1}
4) READ {1, 0 }.{1, 1}
5) READ {0, 1}.{1, 1}
6) WRITE {0, 1}.{1, 1}
7) WRITE {1, 0}.{0, 1}
8) READ {1, 0 }.{1, 0}
```

Using the techniques above, the predecessor and successor lists are determined as:

| Operation | | Predecessor | Successor |
|---|---|---|---|
| 1) WRITE | {1, 0}.{1, 1} | None | 3(O) |
| 2) WRITE | {0, 1}.{1, 1} | None | 5(T), 6(A) |
| 3) WRITE | {1, 0}.{1, 1} | 1(O) | 4(T), 7(A), 8(T) |
| 4) READ | {1, 0}.{1, 1} | 3(T) | 7(A) |
| 5) READ | {0, 1}.{1, 1} | 2(T) | 6(A) |
| 6) WRITE | {0, 1}.{1, 1} | 2(A), 5(A) | None |
| 7) WRITE | {1, 0}.{0, 1} | 4(A) | None |
| 8) READ | {1, 0}.{1, 0} | 3(T) | None |

The corresponding directed acyclic graph for these is illustrated in FIG. 11. The "(O),", "(A)," and "(T)" stand for output dependency, anti-dependency, and true dependency, as explained above. These labels are not essential for the operation to work, but are included to illustrate the types of dependencies identified.

Figure 12:
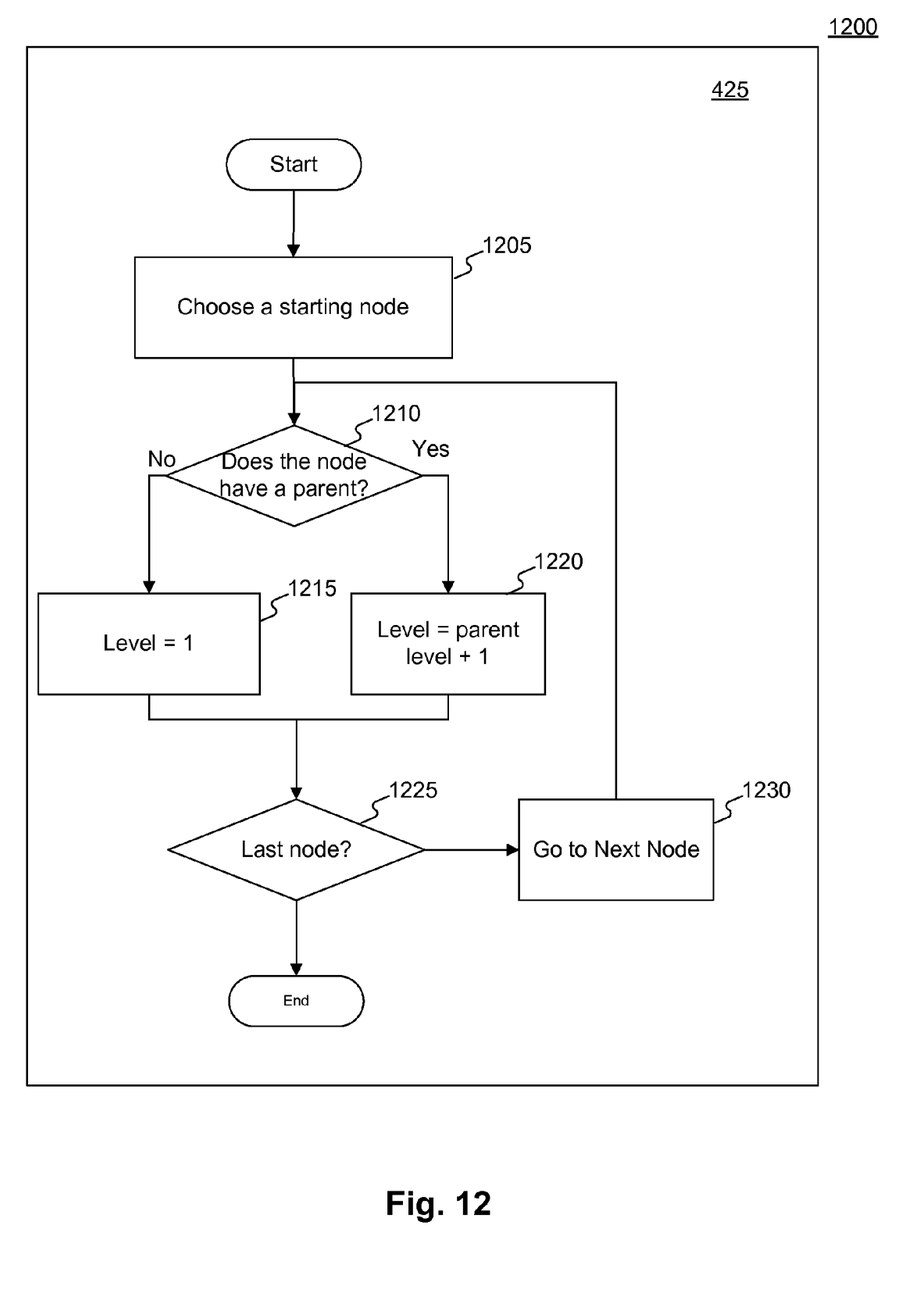
FIG. 12 is a more detailed illustration of the step of "Assign Instructions to Level Numbers" found in FIG. 4.

The process 1200 illustrated in FIG. 12, is an exemplary process that organizes the operations into graphlevel numbers. The operations at each level will all be executed in parallel. In one embodiment the graphlevel is determined by starting at a node of the directed acyclic graph and walking the graph. If the node does not have a parent node, then the level is equal to one (steps 1210 and 1220). If the node does have a parent then the level is equal to the parent node plus one (step 1215). Although it is not necessary to start at a particular node, starting at the lowest numbered node will make level calculations easier to understand (step 1205).

Turning back to exemplary process 400 found in FIG. 4, the parallelizing scheduler starts a thread for each database operation found at the first level (step 425). The threads are joined upon completion (step 430) and a single database commit is executed by the database to finalize the transactions. If there are more levels (step 435), then the database operations at the next level are each begun in its own thread (step 440 and 425). This continues until all levels have been executed. Note that in this example, the parallelizing scheduler reduced eight database instruction cycles down to four, a reduction in the number of cycles by half.

In one embodiment, the parallelizing scheduler can limit the number of threads run on the target database to a set limit by moving dependency chain executions vertically. It may be desired for the target database to only execute a certain number of threads at any given time. For example, perhaps the hardware and software are determined to support a total of ten threads at a time, with no more than five WRITE threads and ten READ threads operating at a time. If the cycle levels would indicate six WRITE operations in a single cycle, one of the dependency chains could simply be moved vertically down by one level. Preference could be given to moving shorter dependency chains and preserving the levels of longer dependency chains. In this way, dependency chains can also be stacked. For example, suppose the parallelizing scheduler analyzes 1000 operations and determines 21 dependency chains, optimizing one chain to 100 levels, and the rest to 20 levels each. The parallelizing scheduler may stack five of the dependency chains without increasing the number of levels by moving them vertically, enabling five threads to be run in every execution level. As a further example, applying these principles to the graph illustrated in FIG. 11, suppose that the target database is limited to executing two threads at a time. When the parallelizing scheduler reaches level 3, too many threads would be executed, so either the instruction represented by node 8 or node 6 may be moved to the next level. If the instruction represented by node 4 were moved, the number of levels would be increased. As mentioned above, preference may be given to moving the operation found in the shorter dependency chain, resulting in the operation represented by node 6 being moved. Preference may also be given to moving the database operation with the highest numbered operation index, resulting in the operation represented by node 8 being moved.

Other embodiments of the invention will be apparent to those skilled in the art from consideration of the specification and practice of the embodiments disclosed herein. It is intended that the specification and examples be considered as exemplary only, with a true scope and spirit of the embodiments being indicated by the following claims.

What is claimed is:

1. A computer-implemented method of parallelizing database commands, comprising:
    receiving, by a computer, a sequence of database commands;
    representing commands in the sequence of database commands as bit vectors, wherein each of the commands is represented by one of the bit vectors;
    comparing a bit vector representing a first command in the sequence of database commands to bit vectors representing other commands in the sequence of database commands;
    determining one or more of a successor data dependency and a predecessor data dependency between the first command and at least one of the other commands based on the sequence of the database commands and the comparison of the bit vector;
    grouping the commands based on the one or more of the successor data dependency and the predecessor data dependency into an execution schedule with cycle operation levels, wherein at least one cycle operation level has at least two of the commands designated to be performed in parallel; and
    providing the execution schedule.

2. The method of claim 1, wherein the providing comprises:
    executing the commands on a database, wherein the commands are executed in parallel based on the execution schedule.

3. The method of claim 1, wherein the comparing comprises:
    determining successor data dependencies for each command; and
    performing a topological sort based on the successor data dependencies.

4. The method of claim 1, wherein the comparing comprises:
    determining predecessor data dependencies for each command; and
    performing a reverse topological sort based on the predecessor data dependencies.

5. The method of claim 1, wherein the grouping comprises:
    organizing commands within the cycle operation levels by moving data dependencies vertically based on a limit to the number of commands that may exist in each cycle.

6. The method of claim 1, wherein the comparing further comprises:
    logically ANDing the bit vector representing the first command and a bit vector representing a second command to determine data dependency between one or more columns affected by the first command and the second command.

7. The method of claim 1, wherein the providing comprises:
    providing a file describing the execution schedule.

8. A system of parallelizing database commands, comprising:
    a non-transitory memory storing instructions; and
    a processor executing the instructions to cause the system to perform a method comprising:
        receiving a sequence of database commands;
        representing commands in the sequence of database commands as bit vectors, wherein each of the commands is represented by one of the bit vectors;
        comparing a bit vector representing a first command in the sequence of database commands to bit vectors representing other commands in the sequence of database commands:
        determining one or more of a successor data dependency and a predecessor data dependency between the first command and at least one of the other commands based on the sequence of the database commands and the comparison of the bit vector:
        grouping the commands based on the one or more of the successor data dependency and the predecessor data dependency into an execution schedule with cycle operation levels, wherein at least one cycle operation level has at least two of the commands designated to be performed in parallel; and providing the execution schedule.

9. The system of claim 8, wherein the providing comprises:

executing the commands on a database, wherein the commands are executed in parallel based on the execution schedule.

10. The system of claim 8, wherein the comparing comprises:

determining successor data dependencies for each command; and performing a topological sort based on the successor data dependencies.

11. The system of claim 8, wherein the comparing comprises:

determining predecessor data dependencies for each command; and performing a reverse topological sort based on the predecessor data dependencies.

12. The system of claim 8, wherein the grouping comprises:

organizing commands within the cycle operation levels by moving data dependencies vertically based on a limit to the number of commands that may exist in each cycle.

13. The system of claim 8, wherein the comparing further comprises:

logically ANDing the bit vector representing the first command and a bit vector representing a second command to determine data dependency between one or more columns affected by the first command and the second command.

14. The system of claim 8, wherein the providing comprises:

providing a file describing the execution schedule.

15. A non-transitory computer-readable storage medium containing instructions which, when executed on a processor, perform a method comprising:

receiving, by a computer, a sequence of database commands;

representing commands in the sequence of database commands as bit vectors, wherein each of the commands is represented by one of the bit vectors;

comparing a bit vector representing a first command in the sequence of database commands to bit vectors representing other commands in the sequence of database commands;

determining one or more of a successor data dependency and a predecessor data dependency between the first command and at least one of the other commands based on the sequence of the database commands and the comparison of the bit vector;

grouping the commands based on the one or more of the successor data dependency and the predecessor data dependency into an execution schedule with cycle operation levels, wherein at least one cycle operation level has at least two of the commands designated to be performed in parallel; and providing the execution schedule.

16. The computer-readable medium of claim 15, wherein the providing comprises:

executing the commands on a database, wherein the commands are executed in parallel based on the execution schedule.

17. The computer-readable medium of claim 15, wherein the comparing comprises:

determining successor data dependencies for each command; and performing a topological sort based on the successor data dependencies.

18. The computer-readable medium of claim 15, wherein the comparing comprises:

determining predecessor data dependencies for each command; and performing a reverse topological sort based on the predecessor data dependencies.

19. The computer-readable medium of claim 15, wherein the grouping comprises:

organizing commands within the cycle operation levels by moving data dependencies vertically based on a limit to the number of commands that may exist in each cycle.

20. The computer-readable medium of claim 15, wherein the comparing comprises:

logically ANDing the bit vector representing the first command and a bit vector representing a second command to determine data dependency between one or more columns affected by the first command and the second command.

21. The computer-readable medium of claim 15, wherein the providing comprises:

providing a file describing the execution schedule.

* * * * *